(12) United States Patent
Luan et al.

(10) Patent No.: US 9,037,460 B2
(45) Date of Patent: May 19, 2015

(54) DYNAMIC LONG-DISTANCE DEPENDENCY WITH CONDITIONAL RANDOM FIELDS

(75) Inventors: Jian Luan, Beijing (CN); Linfang Wang, Beijing (CN); Hairong Xia, Beijing (CN); Sheng Zhao, Beijing (CN); Daniela Braga, Lisboa (PT)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 13/433,186

(22) Filed: Mar. 28, 2012

(65) Prior Publication Data

US 2013/0262105 A1    Oct. 3, 2013

(51) Int. Cl.
| | |
|---|---|
| *G10L 15/26* | (2006.01) |
| *G10L 15/08* | (2006.01) |
| *G10L 13/08* | (2013.01) |
| *G10L 15/197* | (2013.01) |

(52) U.S. Cl.
CPC .............. *G10L 15/083* (2013.01); *G10L 13/08* (2013.01); *G10L 15/197* (2013.01)

(58) Field of Classification Search
CPC ...... G10L 15/142; G10L 15/265; G10L 15/22
USPC ................ 704/235, 256.2; 707/738; 382/155
See application file for complete search history.

(56) References Cited

U.S. PATENT DOCUMENTS

| | | | |
|---|---|---|---|
| 7,689,419 B2 | 3/2010 | Mahajan et al. | |
| 7,890,438 B2 | 2/2011 | Chidlovskii | |
| 8,244,848 B1 * | 8/2012 | Narayanan et al. ........... | 709/223 |
| 2006/0115145 A1 | 6/2006 | Bishop et al. | |
| 2010/0076978 A1 | 3/2010 | Cong et al. | |

OTHER PUBLICATIONS

Li, Ming, et al. "Research of Applying Chain Conditional Random Fields to Semantic Role Labeling." Knowledge Acquisition and Modeling, 2009. KAM'09. Second International Symposium on. vol. 1. IEEE, 2009.*
Wallach, Hanna M. "Conditional random fields: An introduction." Technical Reports (CIS) (2004): 22.*
Liang, Percy, Hal DauméIII, and Dan Klein. "Structure compilation: trading structure for features." Proceedings of the 25th international conference on Machine learning. ACM, 2008.*
Sutton, et al., "An Introduction to Conditional Random Fields for Relational Learning", In Introduction to Statistical Relational Learning, MIT Press, 2006; 35 pgs.
Sutton, Charles A., "Efficient Training Methods for Conditional Random Fields", Published on: Feb. 2008, Available at: http://maroo.cs.umass.edu/pdf/IR-641.pdf; 219 pgs.
Lu, et al., "Better Punctuation Prediction with Dynamic Conditional Random Fields", In Proceedings of the 2010 Conference on Empirical Methods in Natural Language Processing, Oct. 9-11, 2010, pp. 177-186.
Ye, et al., "Conditional Random Fields with High-Order Features for Sequence Labeling", In Advances in Neural Information Processing Systems, vol. 2, Dec. 28, 2009, pp. 2196-2204.

* cited by examiner

*Primary Examiner* — Vincent P Harper
(74) *Attorney, Agent, or Firm* — Steven Spellman; Jim Ross; Micky Minhas

(57) ABSTRACT

Dynamic features are utilized with CRFs to handle long-distance dependencies of output labels. The dynamic features present a probability distribution involved in explicit distance from/to a special output label that is pre-defined according to each application scenario. Besides the number of units in the segment (from the previous special output label to the current unit), the dynamic features may also include the sum of any basic features of units in the segment. Since the added dynamic features are involved in the distance from the previous specific label, the searching lattice associated with Viterbi searching is expanded to distinguish the nodes with various distances. The dynamic features may be used in a variety of different applications, such as Natural Language Processing, Text-To-Speech and Automatic Speech Recognition. For example, the dynamic features may be used to assist in prosodic break and pause prediction.

20 Claims, 8 Drawing Sheets

DYNAMIC LONG-DISTANCE DEPENDENCY WITH CONDITIONAL RANDOM FIELDS

BACKGROUND

Conditional Random Fields (CRFs) are probabilistic models for computing the probability p(Y|X) of a possible output label sequence Y=($y_1$, $y_2$, . . . , $y_n$) given the input feature sequence X=($x_1$, $x_2$, . . . , $x_n$). CRFs are widely used in Natural Language Processing (NLP). For example, CRFs may be used in the frontend of TTS (Text To Speech) to implement word segmentation, POS (Part Of Speech) tagging, prosodic break prediction, and the like. CRFs use an N-gram feature (generally bigram) to model the relationship between neighboring output types. The computation complexity grows exponentially as N increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Dynamic features are utilized with CRFs to handle long-distance dependencies of output labels. The dynamic features present a probability distribution involved in explicit distance from/to a special output label that is pre-defined according to each application scenario. Besides the number of units in the segment (from the previous special output label to the current unit), the dynamic features may also include the sum of any basic features of units in the segment. Since the added dynamic features are involved in the distance from the previous specific label, the searching lattice associated with Viterbi searching is expanded to distinguish the nodes with various distances. The dynamic features with CRF may be used in a variety of different applications, such as Natural Language Processing, Text-To-Speech and Automatic Speech Recognition. For example, the dynamic features may be used to assist in prosodic break and pause prediction.

DETAILED DESCRIPTION

Figure 1:
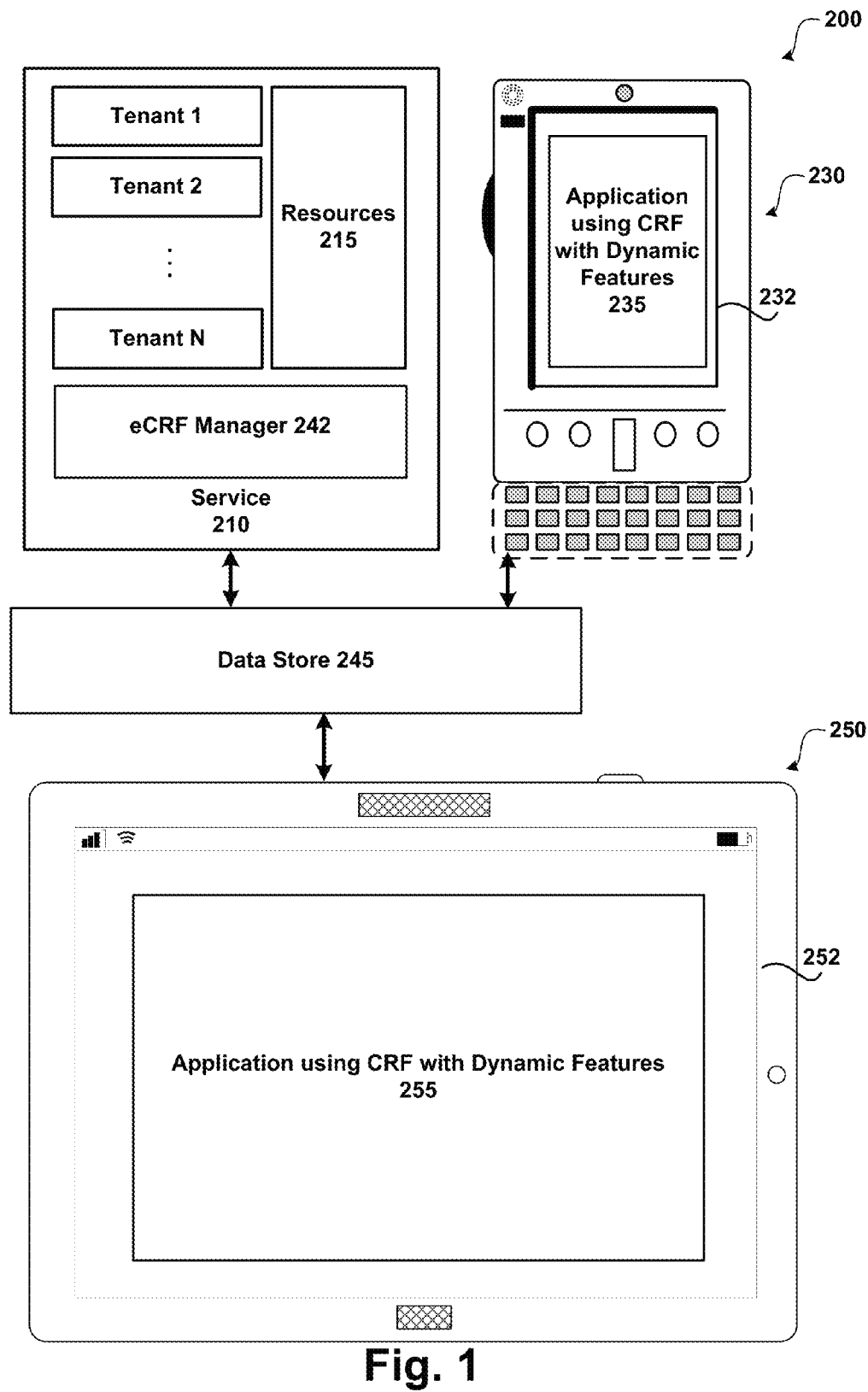
FIG. 1 illustrates an exemplary system for using expanded CRF modeling to dynamically handle long-distance dependencies.

Referring now to the drawings, in which like numerals represent like elements, various embodiments will be described.

FIG. 1 illustrates an exemplary system for using expanded CRF modeling to dynamically handle long-distance dependencies. As illustrated, system 200 includes service 210, data store 245, touch screen input device/display 250 (e.g. a slate) and smart phone 230.

As illustrated, service 210 is a cloud based and/or enterprise based service that may be configured to provide services, such as productivity services (e.g. MICROSOFT OFFICE 365 or some other cloud based/online service that is used to interact with items (e.g. messages, spreadsheets, documents, charts, and the like). The service may be interacted with using different types of input/output. For example, a user may use touch input, hardware based input, speech input, and the like. Functionality of one or more of the services/applications provided by service 210 may also be configured as a client/server based application. For example, a client device may include an application that performs operations that utilize dynamic long-distance dependency features with an expanded CRF. Although system 200 shows a service relating to productivity applications, other services/applications may be configured to utilize dynamic long-distance dependency features with and expanded CRF.

As illustrated, service 210 is a multi-tenant service that provides resources 215 and services to any number of tenants (e.g. Tenants 1-N). Multi-tenant service 210 is a cloud based service that provides resources/services 215 to tenants subscribed to the service and maintains each tenant's data separately and protected from other tenant data.

System 200 as illustrated comprises a touch screen input device/display 250 (e.g. a slate/tablet device) and smart phone 230 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 230 and touch screen input device/display 250 are configured to use expanded CRF (eCRF) modeling and to receive text/speech input and output text/speech. Smart phone 230 and touch screen input device/display 250 may also be configured to include eCRF applications (e.g. applications 235 and 255) related to one or more of: automatic speech recognition, Natural Language Processing (NLP), text-to-speech, and the like.

As illustrated, touch screen input device/display 250 and smart phone 230 shows exemplary displays 252/232 showing the use of an application using eCRF modeling (235, 255). For example, a user associated with slate device 250 may be using eCRF application 255 to enter text into a word processing application. A user associated with smartphone 230 may be interacting with an eCRF application 235 that provides navigation services. Many other types of applications may utilize eCRF as described herein. Data may be stored on a device (e.g. smart phone 230, slate 250 and/or at some other location (e.g. network data store 245). The eCRF applications 235, 255 may be a client based application, a server based application, a cloud based application and/or some combination.

eCRF manager 242 is configured to perform operations relating to eCRF applications (e.g. automatic speech recognition, Natural Language Processing (NLP), text-to-speech, and the like). While eCRF manager 242 is shown within service 210, the functionality of the eCRF manager may be included in other locations (e.g. on smart phone 230 and/or slate device 250). As discussed, CRFs are probabilistic models for computing the probability p(Y|X) of a possible output label sequence $Y=(y_1, y_2, \ldots, y_n)$ given the input feature sequence $X=(x_i, x_2, \ldots, x_n)$.

The combined probability of Y and X is expressed as: $p(Y,X)=\Pi_{t=1}^T \exp\{\Sigma_{k=1}^K \lambda_k f_k(y_t, y_{t-1}, x_t)\}$ where, T is the length of the sequence, K is the number of feature functions, $\lambda_k$ is the weight for k-th feature functions $f_k$, which model the relationship among current input feature $x_t$, previous output label $y_{t-1}$ and current output label $y_t$. The standard CRF function as shown above, however, performs poorly at modeling the relationship of distant labels. The standard CRF function is expanded to include dynamic features for long-distance dependencies.

The expanded CRF function with dynamic features (eCRF) can be expressed as: $p(Y,X)=\Pi_{t=1}^T \exp\{\Sigma_{k=1}^K \lambda_k f_k(y_t, y_{t-1}, x_t)+\Sigma_{l=1}^L \theta_l g_l(y_t, d_t^r, x_t)\}$ where, L is the number of dynamic feature functions, $\theta_l$ is the weight for l-th feature functions $g_l$, and $d_t^r$ is the distance of current label from/to a previous/next specific output label r.

According to an embodiment, there is a single specific label, which has a long-distance impact on other labels. For example, in the case of break prediction, an intonation phrase break will impact labels following the break until the next intonation phrase break.

Dynamic feature functions $g_l(y_t, d_t^r, x_t)$ may include: the number of units from the previous specific label to current unit (e.g. the number of words from previous intonation phrase break); the sum/combination of features of every unit between current unit and the previous specific label (e.g. number of syllables from previous specific label, the sum of syllable numbers of every word in the scope); the others involved in previous special label (e.g. whether the previous intonation phrase break is followed by a punctuation).

To simplify the description, the following may be defined:

$\psi(y_t, y_{t-1}, x_t)=\exp\{\Sigma_{k=1}^K \lambda_k f_k(y_t, y_{t-1}, x_t)\}$ $\varphi_t(y_t, d_t^r, x_t)=\exp\{\Sigma_{l=1}^L \theta_l g_l(y_t, d_t^r, x_t)\}$ The expanded CRF equation (eCRF) may be expressed as e $p(Y,X)=\Pi_{t=1}^T \psi(t_y, y_{t-1}, x_t)\varphi(y_t, d_t^r, x_t)$ And the condition probability of Y given X is:

$$p(Y|X) = \frac{\prod_{t=1}^T \psi_t(y_t, y_{t-1}, x_t)\varphi_t(y_t, d_t^r, x_t)}{\sum_{Y'} \prod_{t=1}^T \psi_t(y'_t, y'_{t-1}, x_t)\varphi_t(y'_t, d_t^r, x_t)}$$

The condition probability of Y given X equals the combined probability of X and Y divided by sum of combined probability of X with the possible Ys.

Forward probability is expressed as:

$$\alpha_t(j, d) = \begin{cases} \alpha_{t-1}(r)\psi(j, r, x_t)\varphi(j, 1, x_t) & d=1 \\ \sum_{i \in S, i \neq r} \alpha_{t-1}(i, d-1)\psi(j, i, x_t)\varphi(j, d-1, x_t) & d>1 \end{cases}$$

$$\alpha_t(r) = $$

$$\alpha_{t-1}(r)\psi(r, r, x_t)\varphi(r, 1, x_t) + \sum_{\substack{i \in S \\ i \neq r}} \sum_{d=1}^{t-1} \alpha_{t-1}(i, d)\psi(r, i, x_t)\varphi(r, d+1, x_t)$$

where i and j represent one output label respectively, r is the specific output label, d is the distance of current label from the previous specific output label and S is the collection of possible output labels.

Backward probability is expressed as:

$$\beta_t(j, d) = \beta_{t+1}(r)\psi(r, j, x_{t+1})\varphi(r, d+1, x_{t+1}) +$$

$$\sum_{\substack{i \in S, \\ i \neq r}} \beta_{t+1}(i, d+1)\psi(i, j, x_{t+1})\varphi(i, d+1, x_{t+1})$$

$$\beta_t(r) = \beta_{t+1}(r)\psi(r, r, x_{t+1})\varphi(r, 1, x_{t+1}) +$$

$$\sum_{\substack{i \in S, \\ i \neq r}} \beta_{t+1}(i, 1)\psi(i, r, x_{t+1})\varphi(i, 1, x_{t+1}).$$

The weights for each feature function are estimated by:

$\lambda_k = (\tilde{E}(f_k) - E(f_k)) \cdot \sigma^2$ $\theta_l = (\tilde{E}(\theta_l) - E(\theta_l)) \cdot \sigma^2$ where, The $\sigma^2$ is preset parameter to help in avoiding over fitting, vector $\tilde{E}(f_k)$ and $\tilde{E}(\theta_l)$ are actual expectations and may be obtained by counting how often each feature occurs in the training data. $E(f_k)$ and $E(\theta_l)$ are the estimated expectations and can be computed with forward and backward probabilities as:

$$E(f_k) = \frac{1}{\beta_0(\perp)} \sum_{t=1}^T \sum_{y_t \in S} \sum_{y_{t-1} \in S} \sum_{d=0}^{t-1} \alpha_{t-1}(y_{t-1}, d)$$

$$\psi(y_t, y_{t-1}, x_t)\varphi(y_t, d, x_t)\beta_t(y_t, d+1) \cdot f_k(y_t, y_{t-1}, x_t)$$

$$E(\theta_l) = \frac{1}{\beta_0(\perp)} \sum_{t=1}^T \sum_{y_t \in S} \sum_{d=0}^t \alpha_t(y_t, d)\beta_t(y_t, d) \cdot \theta_l(y_t, d, x_t)$$

where $\perp$ is the dedicated start value of output label, $\alpha_t(r,d) = \alpha_t(r) | \forall d$ and $\alpha_t(y_t, 0) = 0 | \forall y_t \neq r$.

Figure 2:
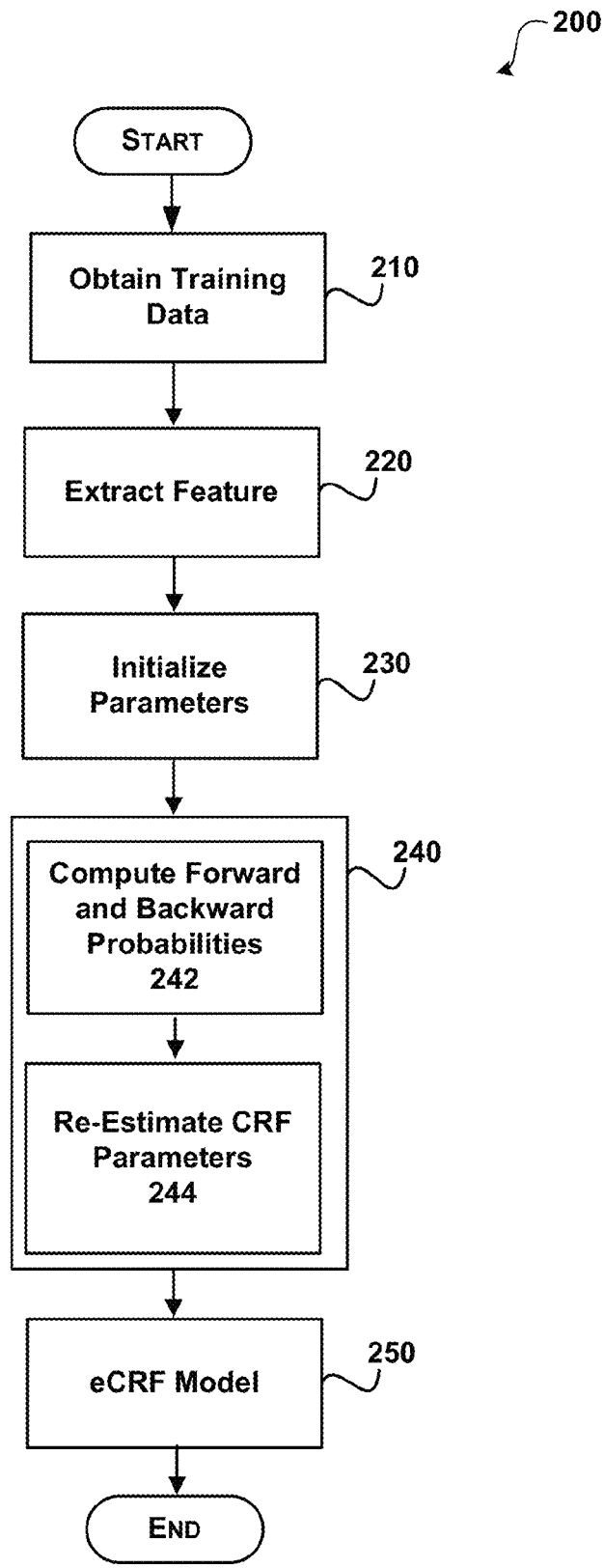
FIG. 2 shows a process for expanded CRF training.
Figure 3:
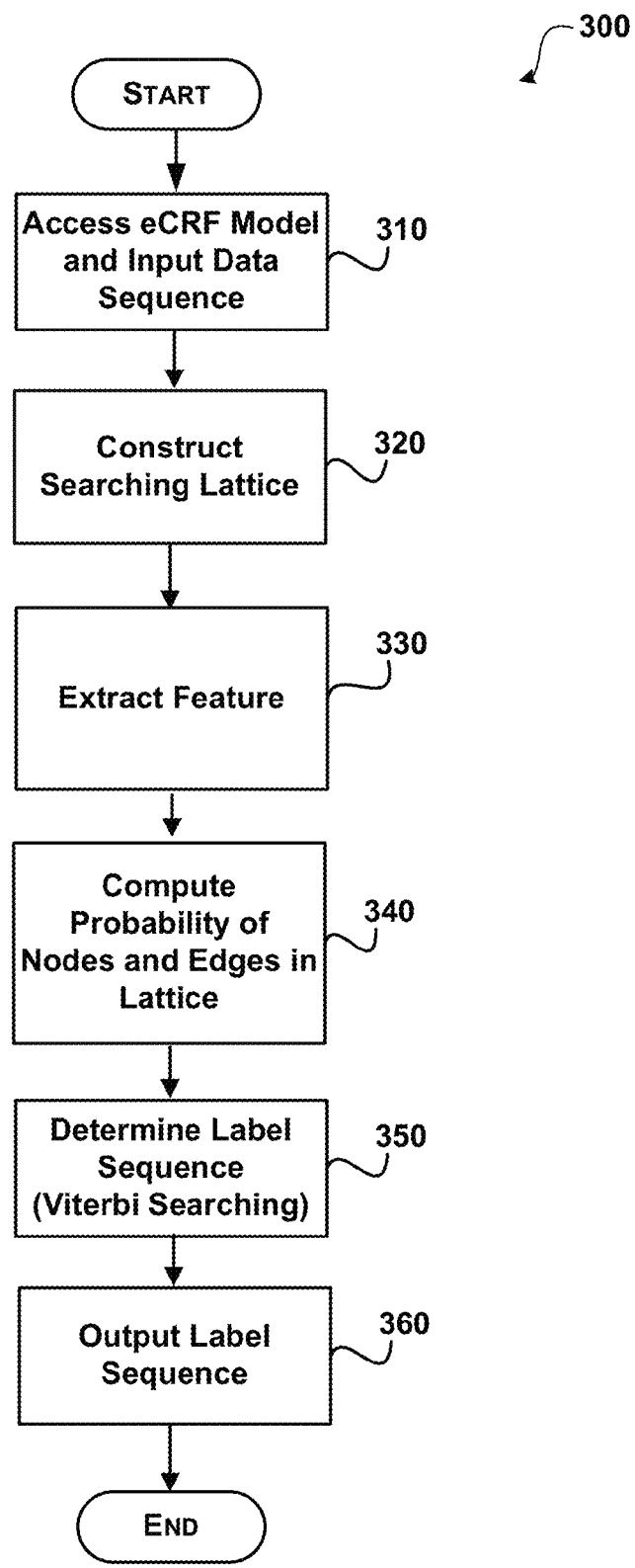
FIG. 3 illustrates a process for eCRF prediction.

FIGS. 2 and 3 show an illustrative process using expanded CRF modeling. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 2 shows a process for expanded CRF training.

After a start operation, the process 200 flows to operation 210, where training data is obtained.

Moving to operation 220, the feature $f_k(y_t, y_{t-1}, x_t)$ and $\theta_l(y_t, d_t^r, x_t)$ are extracted from the training data.

Flowing to operation 230, the parameters are initialized. This includes initializing $\sigma^2$ and weights $\lambda_k$ and $\theta_l$.

Transitioning to operation 240, forward and backward probabilities are computed (242) and the weights are re-estimated (244). Operations 242 and 244 are iterated till convergence.

At operation 242, the forward probability is computed using:

$$\alpha_t(j, d) = \begin{cases} \alpha_{t-1}(r)\psi(j, r, x_t)\varphi(j, 1, x_t) & d = 1 \\ \sum_{\substack{i \in S, \\ i \neq r}} \alpha_{t-1}(i, d-1)\psi(j, i, x_t)\varphi(j, d-1, x_t) & d > 1 \end{cases}$$

$$\alpha_t(r) = \alpha_{t-1}(r)\psi(r, r, x_t)\varphi(r, 1, x_t) + \sum_{\substack{i \in S, \\ i \neq r}} \sum_{d=0}^{t-1} \alpha_{t-1}(i, d)\psi(r, i, x_t)\varphi(r, d+1, x_t)$$

where i and j represent one output label respectively, r is the specific output label, d is the distance of current label from the previous specific output label and S is the collection of possible output labels.

The Backward probability is computed using:

$$\beta_t(j, d) = \beta_{t+1}(r)\psi(r, j, x_{t+1})\varphi(r, d+1, x_{t+1}) + \sum_{\substack{i \in S, \\ i \neq r}} \beta_{t+1}(i, d+1)\psi(i, j, x_{t+1})\varphi(i, d+1, x_{t+1})$$

$$\beta_t(r) = \beta_{t+1}(r)\psi(r, r, x_{t+1})\varphi(r, 1, x_{t+1}) + \sum_{\substack{i \in S, \\ i \neq r}} \beta_{t+1}(i, 1)\psi(i, r, x_{t+1})\varphi(i, 1, x_{t+1})$$

At operation 244, the weights $\lambda_k$ and $\theta_l$ are re-estimated using:

$$\lambda_k = (\tilde{E}(f_k) - E(f_k)) \cdot \sigma^2$$

$$\theta_l = (\tilde{E}(\theta_l) - E(\theta_l)) \cdot \sigma^2$$

where, The $\sigma^2$ is preset parameter to help in avoiding over fitting, vector $\tilde{E}(f_k)$ and $\tilde{E}(\theta_l)$ are actual expectations and may be obtained by counting how often each feature occurs in the training data. $E(f_k)$ and $E(\theta_l)$ are the estimated expectations and can be computed with forward and backward probabilities as:

$$E(f_k) = \frac{1}{\beta_0(\perp)} \sum_{t=1}^{T} \sum_{y_t \in S} \sum_{y_{t-1} \in S} \sum_{d=0}^{t-1} \alpha_{t-1}(y_{t-1}, d)$$

$$\psi(y_t, y_{t-1}, x_t)\varphi(y_t, d, x_t)\beta_t(y_t, d+1) \cdot f_k(y_t, y_{t-1}, x_t)$$

$$E(\theta_l) = \frac{1}{\beta_0(\perp)} \sum_{t=1}^{T} \sum_{y_t \in S} \sum_{d=0}^{t} \alpha_t(y_t, d)\beta_t(y_t, d) \cdot \theta_l(y_t, d, x_t)$$

where $\perp$ is the dedicated start value of output label, $\alpha_t(r,d) = \alpha_t(r) | \forall d$ and $\alpha_t(y_t, 0) = 0 | \forall y_t \neq r$.

Moving to operation 250, the eCRF model parameters $\lambda_k$ and $\theta_l$ are output.

FIG. 3 illustrates a process for eCRF prediction.

After a start block, process 300 flows to operation 310 where the input data sequence for the CRF model is accessed.

Figure 4:
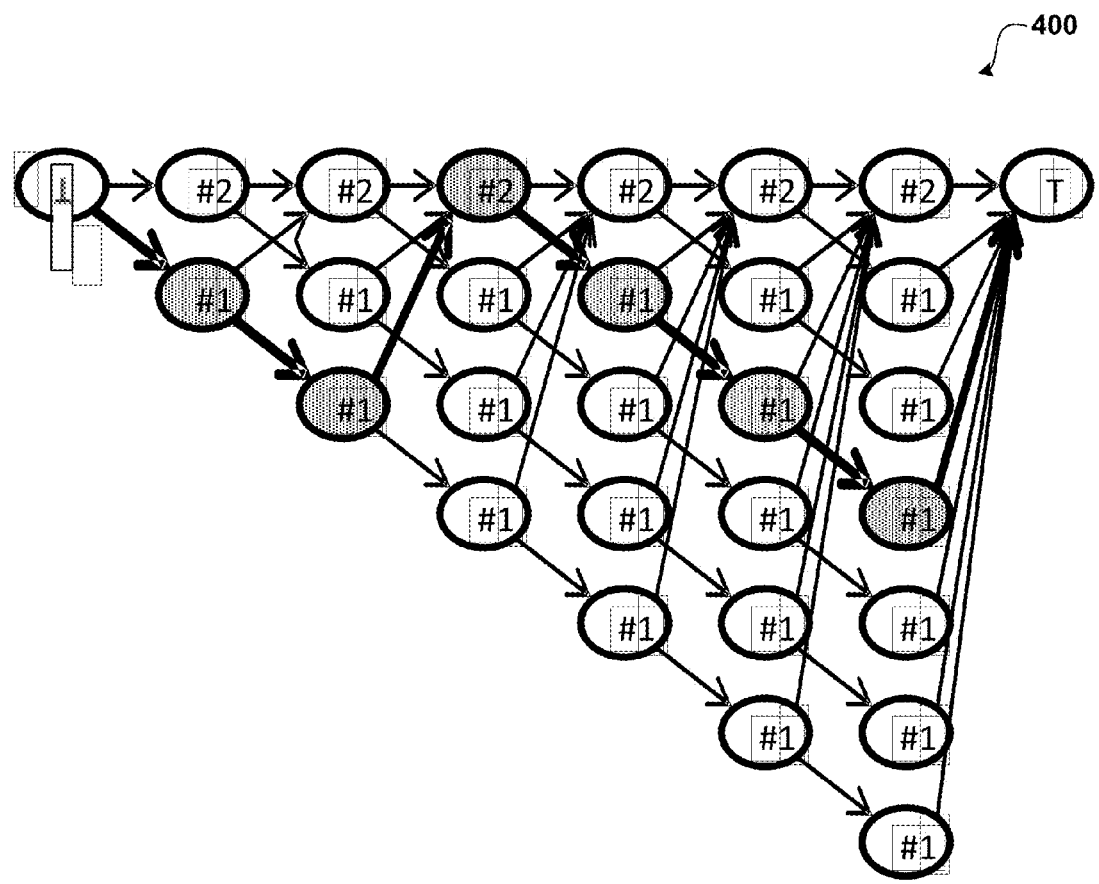
FIG. 4 shows an example searching lattice with dynamic features.

Moving to operation 320, the searching lattice is constructed using the input data sequence according to the CRF model (See FIG. 4 for an exemplary searching lattice with dynamic features).

Transitioning to operation 330, the features used by the eCRF model are extracted for each node and edge in the constructed lattice.

Flowing to operation 340, the probability of the nodes and edges in the searching lattice are computed. The weights are looked up in the CRF model according to the feature values and then the probabilities of each node and edge are computed.

Moving to operation 350, the label sequence is determined. According to an embodiment, Viterbi searching is used to determine an output label sequence. Referring to FIG. 4, $\perp$ is a start label and T is an end label. In one column, there may be more than one #1 nodes. They have different feature values due to the different distance from the previous #2 label. Using the searching method, an optimized path through the searching lattice is determined after searching the possible paths in the searching lattice.

Flowing to operation 360, the obtained label sequence is output.

FIG. 4 shows an example searching lattice with dynamic features. Since the added dynamic features are involved in the distance from the previous specific label, the searching lattice is expanded (as compared to a searching lattice constructed using a standard CRF model) to distinguish the nodes with various distances. Number 2 is the specific label and number 1 is another possible label. $\perp$ and T are dedicated start and end labels respectively.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
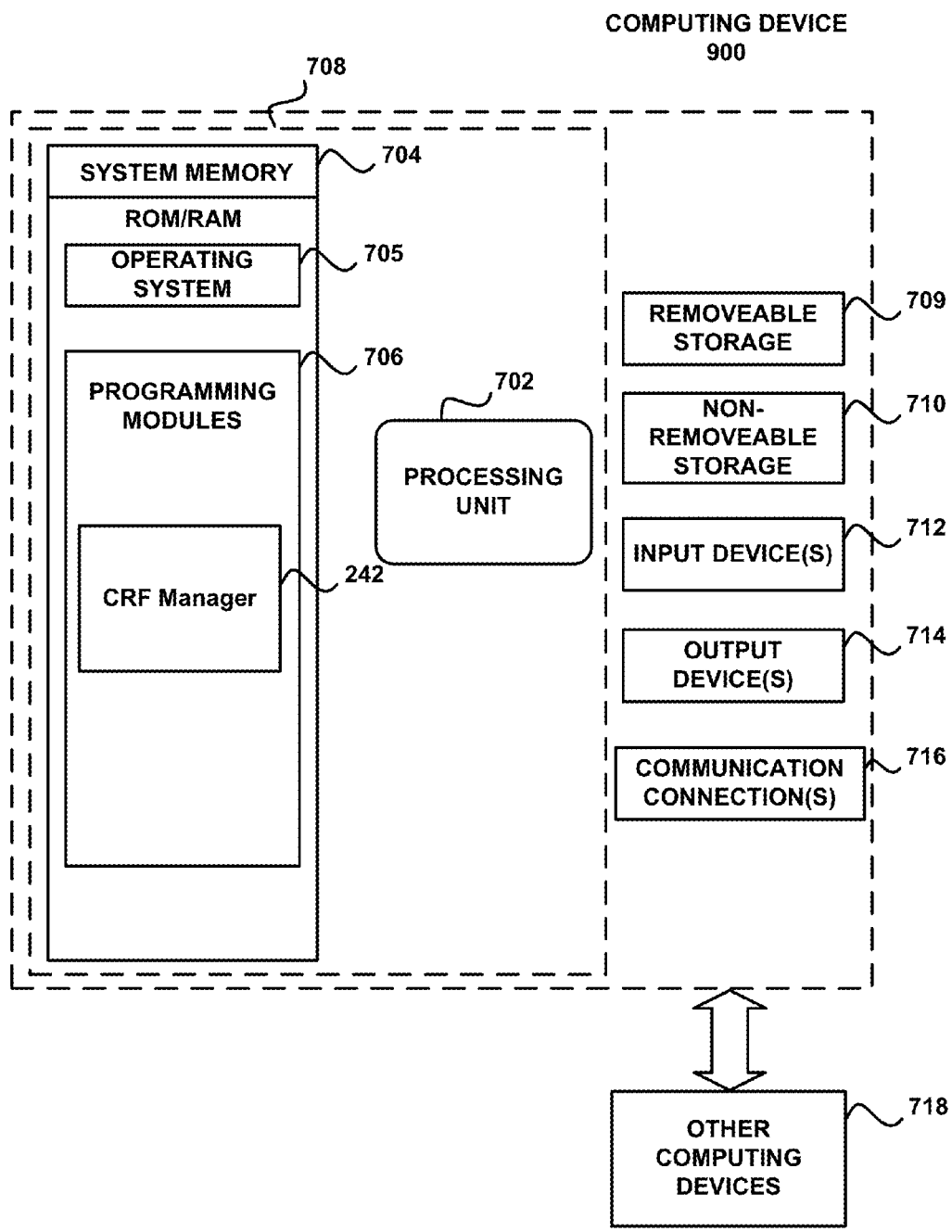
FIGS. 5-7 and the associated descriptions provide a discussion of a variety of operating environments in which embodiments of the invention may be practiced.
Figure 6A:
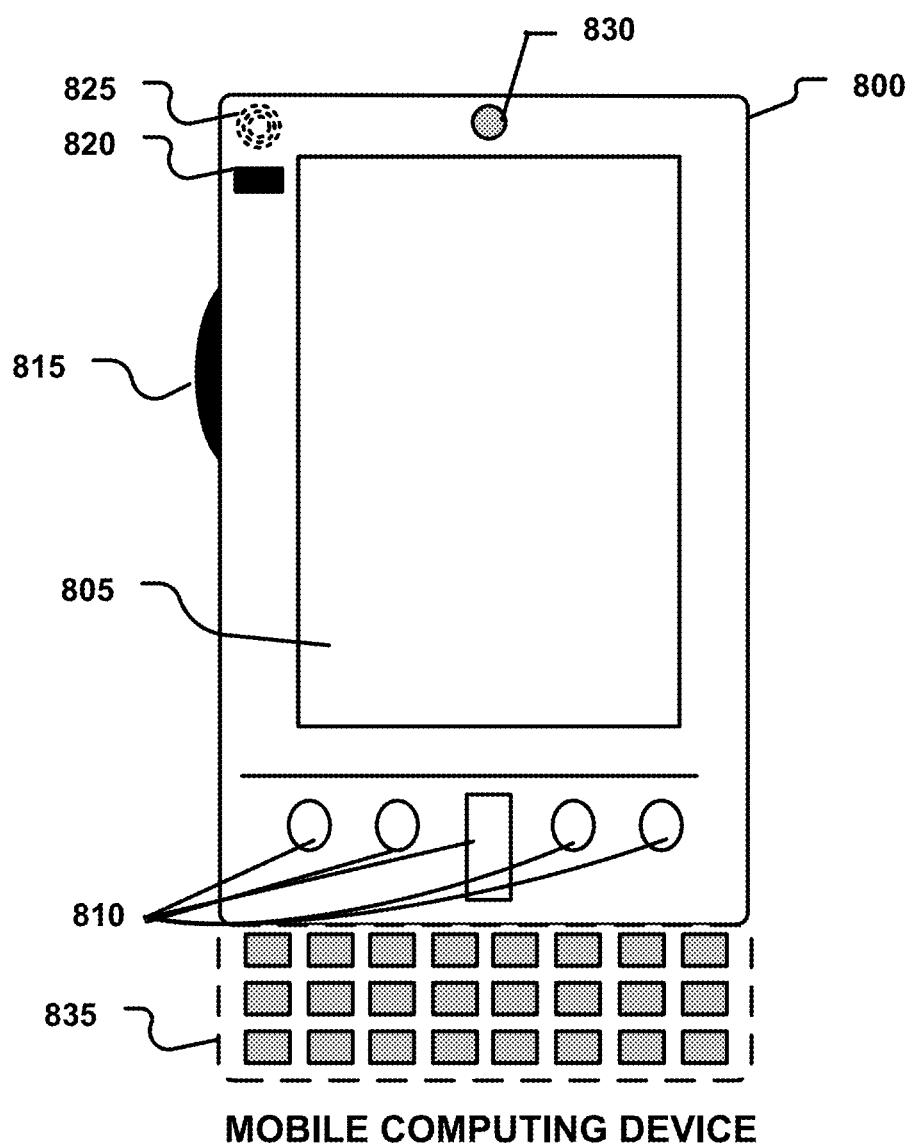
Figure 6B:
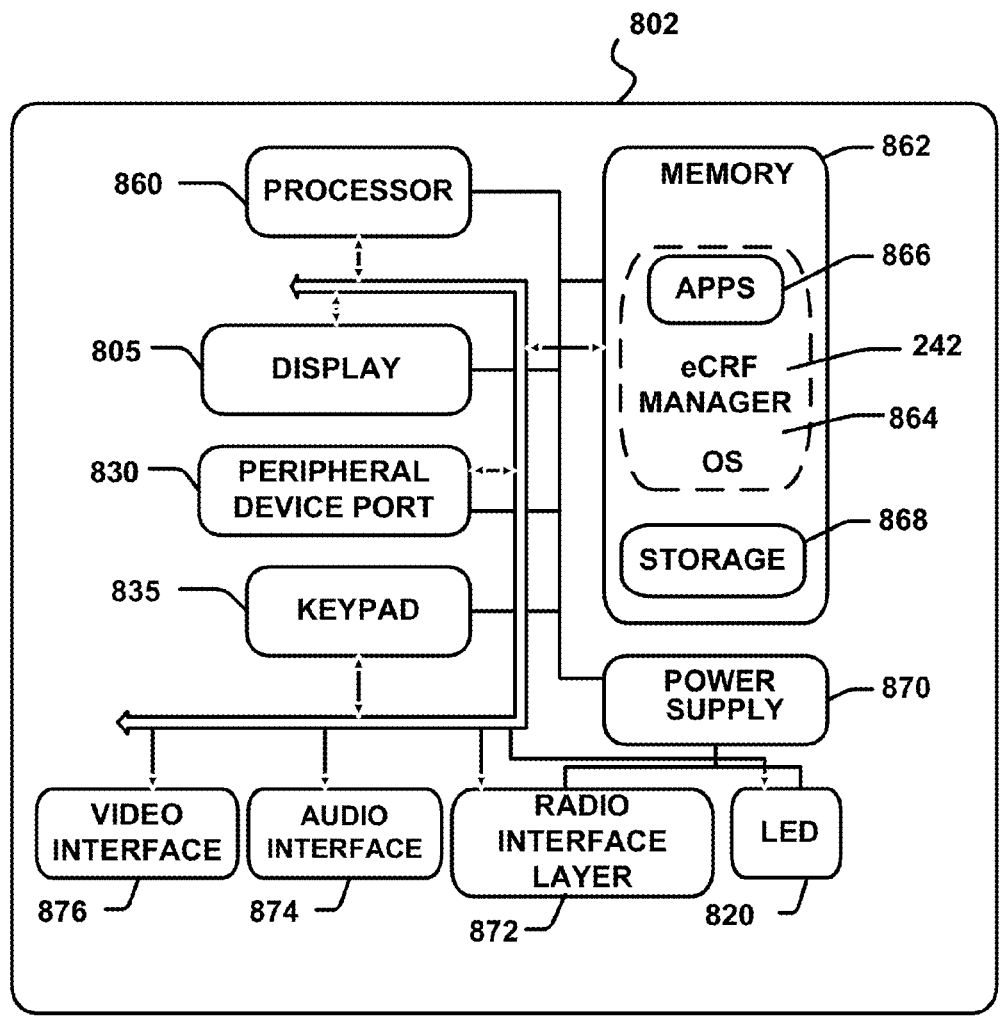
Figure 7:
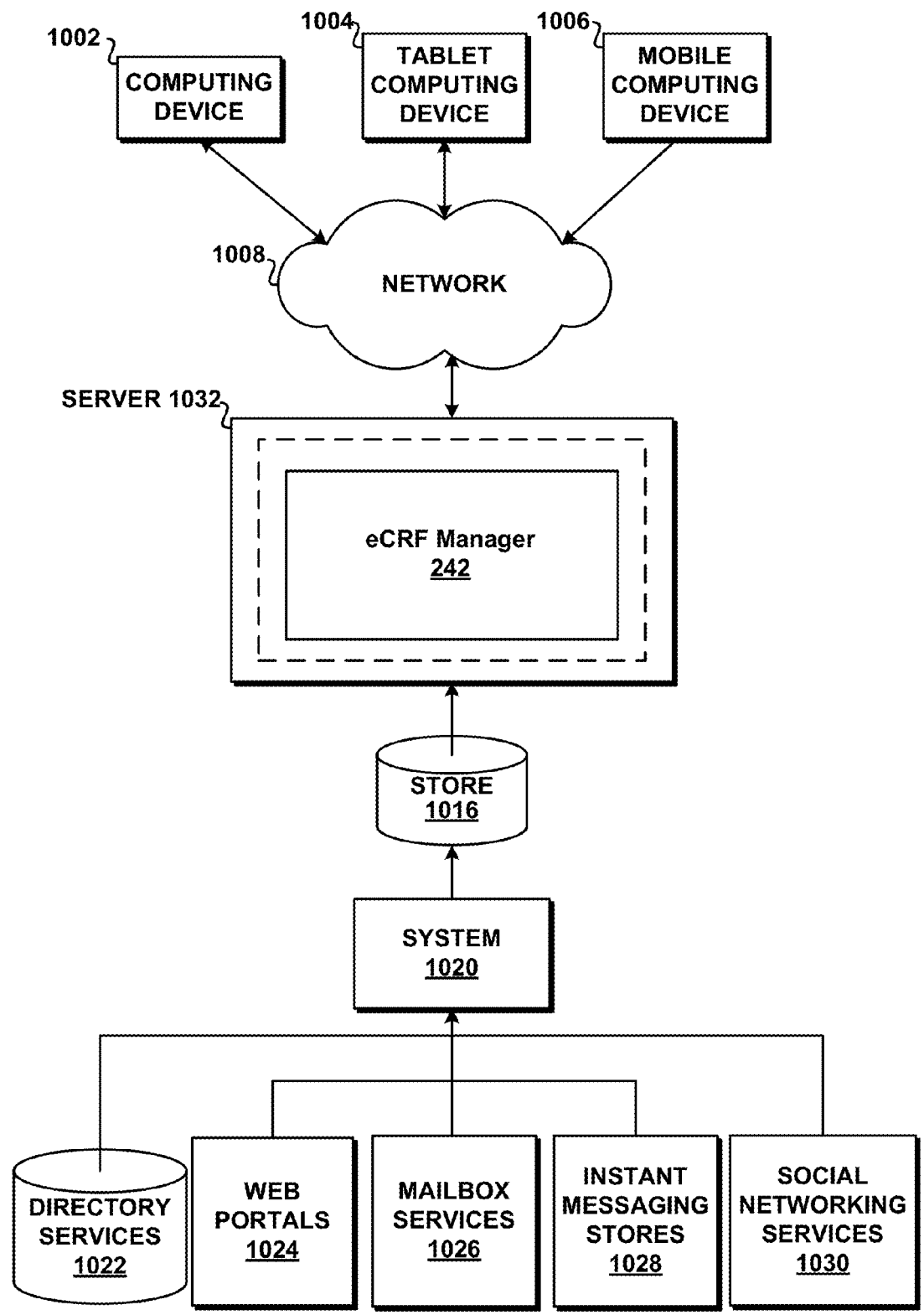

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 900 with which embodiments of the invention may be practiced. The computing device components described below may be suitable for the computing devices described above. In a basic configuration, computing device 900 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a web browser application 720. Operating system 705, for example, may be suitable for controlling computing device 900's operation. In one embodiment, programming modules 706 may include an eCRF manager 242, as described above, installed on computing device 900. Furthermore, embodiments of the invention may be practiced in conjunction with a graphics library, other operating systems, or any other application program and is not limited to any particular application or system. This basic configuration is illustrated in FIG. 4 by those components within a dashed line 708.

Computing device 900 may have additional features or functionality. For example, computing device 900 may also include additional data storage devices (removable and/or non-removable) such as, for example, magnetic disks, optical disks, or tape. Such additional storage is illustrated in FIG. 4 by a removable storage 709 and a non-removable storage 710.

As stated above, a number of program modules and data files may be stored in system memory 704, including operating system 705. While executing on processing unit 702, programming modules 706, such as the eCRF manager may perform processes including, for example, method 300 as described above. The aforementioned process is an example, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 242 may be operated via application-specific logic integrated with other components of the computing device/system 900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 800 for implementing the embodiments is illustrated. In a basic configuration, mobile computing device 800 is a handheld computer having both input elements and output elements. Input elements may include touch screen display 805 and input buttons 815 that allow the user to enter information into mobile computing device 800. Mobile computing device 800 may also incorporate an optional side input element 815 allowing further user input. Optional side input element 815 may be a rotary switch, a button, or any other type of manual input element. In alternative embodiments, mobile computing device 800 may incorporate more or less input elements. For example, display 805 may not be a touch screen in some embodiments. In yet another alternative embodiment, the mobile computing device is a portable phone system, such as a cellular phone having display 805 and input buttons 815. Mobile computing device 800 may also include an optional keypad 835. Optional keypad 815 may be a physical keypad or a "soft" keypad generated on the touch screen display.

Mobile computing device 800 incorporates output elements, such as display 805, which can display a graphical user interface (GUI). Other output elements include speaker 825 and LED light 820. Additionally, mobile computing device 800 may incorporate a vibration module (not shown), which causes mobile computing device 800 to vibrate to notify the user of an event. In yet another embodiment, mobile computing device 800 may incorporate a headphone jack (not shown) for providing another means of providing output signals.

Although described herein in combination with mobile computing device 800, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating components of a mobile computing device used in one embodiment, such as the computing device shown in FIG. 6A. That is, mobile computing device 800 can incorporate system 802 to implement some embodiments. For example, system 802 can be used in implementing a "smart phone" that can run one or more applications similar to those of a desktop or notebook computer such as, for example, browser, e-mail, scheduling, instant messaging, and media player applications. In some embodiments, system 802 is integrated as a computing device, such as an integrated personal digital assistant (PDA) and wireless phone.

One or more application programs 866 may be loaded into memory 862 and run on or in association with operating system 864. Examples of application programs include phone dialer programs, e-mail programs, PIM (personal information management) programs, word processing programs, spreadsheet programs, Internet browser programs, messaging programs, and so forth. System 802 also includes non-volatile storage 868 within memory 862. Non-volatile storage 868 may be used to store persistent information that should not be lost if system 802 is powered down. Applications 866 may use and store information in non-volatile storage 868, such as e-mail or other messages used by an e-mail application, and the like. A synchronization application (not shown) may also reside on system 802 and is programmed to interact with a corresponding synchronization application resident on a host computer to keep the information stored in non-volatile storage 868 synchronized with corresponding information stored at the host computer. As should be appreciated, other applications may be loaded into memory 862 and run on the device 800, including the eCRF manager 242, described above.

System 802 has a power supply 870, which may be implemented as one or more batteries. Power supply 870 might further include an external power source, such as an AC adapter or a powered docking cradle that supplements or recharges the batteries.

System 802 may also include a radio 872 that performs the function of transmitting and receiving radio frequency communications. Radio 872 facilitates wireless connectivity between system 802 and the "outside world", via a communications carrier or service provider. Transmissions to and from radio 872 are conducted under control of OS 864. In other words, communications received by radio 872 may be disseminated to application programs 866 via OS 864, and vice versa.

Radio 872 allows system 802 to communicate with other computing devices, such as over a network. Radio 872 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 802 is shown with two types of notification output devices; LED 820 that can be used to provide visual notifications and an audio interface 874 that can be used with speaker 825 to provide audio notifications. These devices may be directly coupled to power supply 870 so that when activated, they remain on for a duration dictated by the notification mechanism even though processor 860 and other components might shut down for conserving battery power. LED 820 may be programmed to remain on indefinitely until the user takes action to indicate the powered-on status of the device. Audio interface 874 is used to provide audible signals to and receive audible signals from the user. For example, in addition to being coupled to speaker 825, audio interface 874 may also be coupled to a microphone 820 to receive audible input, such as to facilitate a telephone conversation. In accordance with embodiments of the present invention, the microphone 820 may also serve as an audio sensor to facilitate control of notifications, as will be described below. System 802 may further include video interface 876 that enables an operation of on-board camera 830 to record still images, video stream, and the like.

A mobile computing device implementing system 802 may have additional features or functionality. For example, the device may also include additional data storage devices (removable and/or non-removable) such as, magnetic disks, optical disks, or tape. Such additional storage is illustrated in FIG. 6B by storage 868. Computer storage media may include volatile and nonvolatile, removable and non-removable media implemented in any method or technology for storage of information, such as computer readable instructions, data structures, program modules, or other data.

Data/information generated or captured by the device 800 and stored via the system 802 may be stored locally on the device 800, as described above, or the data may be stored on any number of storage media that may be accessed by the device via the radio 872 or via a wired connection between the device 800 and a separate computing device associated with the device 800, for example, a server computer in a distributed computing network such as the Internet. As should be appreciated such data/information may be accessed via the device 800 via the radio 872 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for using eCRF modelling, as described above.

Components managed via the eCRF manager 242 may be stored in different communication channels or other storage types. For example, components along with information from which they are developed may be stored using directory services 1022, web portals 1024, mailbox services 1026, instant messaging stores 1028 and social networking sites 1030. The systems/applications 242, 1020 may use any of these types of systems or the like for enabling management and storage of components in a store 1016. A server 1032 may provide communications for managed components and content to clients. As one example, server 1032 may provide speech related services. Server 1032 may provide services and content over the web to clients through a network 1008. Examples of clients that may utilize server 1032 include computing device 1002, which may include any general purpose personal computer, a tablet computing device 1004 and/or mobile computing device 1006 which may include smart phones. Any of these devices may obtain display component management communications and content from the store 1016.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, performed by a processor of a computer system, utilizing an expanded Conditional Random Field (eCRF) model, the method comprising:
    performing actions, by an eCRF manager, relating to eCRF applications, the actions comprising:
    accessing an eCRF model that includes modeling of labels with long-distance dependencies;
    constructing an expanded searching lattice comprising nodes and edges;
    extracting features for the nodes and edges in the searching lattice, wherein the features include feature values, and wherein the feature values are based on a distance from the labels with long-distance dependencies;
    computing, by the processor, probabilities of the nodes and the edges in the searching lattice;
    determining a label sequence using the searching lattice; and
    outputting the label sequence.

2. The method of claim 1, wherein the eCRF model comprises a first portion of the model that corresponds to a standard CRF model and a second portion that corresponds to the modeling of labels with long-distance dependencies expressed by:
    $\Sigma_{l=1}^{L} \theta_l g_l(y_t, d_t^r, x_t)$ where L is the number of dynamic feature functions, $\theta_l$ is the weight for l-th feature functions $g_l$, and $d_t^r$ is the distance of current label from/to a previous/next specific output label r and wherein $x_t$ is the current input feature.

3. The method of claim 1, wherein the eCRF model is expressed by:
    $p(Y,X) = \Pi_{t=1}^{T} \exp\{\Sigma_{k=1}^{K} \lambda_k f_k(y_t, y_{t-1}, x_t) + \Sigma_{l=1}^{L} \theta_l g_l(y_t, d_t^r, x_t)\}$ where T is the length of the sequence, K is the number of feature functions, $\lambda_k$ is the weight for k-th feature functions $f_k$, which model a relationship among current input feature $x_t$, a previous output label $y_{t-i}$ and a current output label $y_t$, and where L is a number of dynamic feature functions, $\theta_l$ is a weight for l-th feature functions $g_l$, and $d_t^r$ are a distance of the current label from/to a previous/next specific output label r.

4. The method of claim 3, further comprising extracting the features $f_k(y_t, y_{t-1}, x_t)$ and $\theta_l(y_t, d_t^r, x_t)$ from the input data and initializing weights $\lambda_k$ and $\theta_1$.

5. The method of claim 3, further comprising computing forward and backward probabilities and re-estimating the weights.

6. The method of claim 5, wherein computing the forward probabilities is computed using:

$$\alpha_t(j, d) = \begin{cases} \alpha_{t-1}(r)\psi(j, r, x_t)\varphi(j, 1, x_t) & d = 1 \\ \sum_{i \in S, i \neq r} \alpha_{t-1}(i, d-1)\psi(j, i, x_t)\varphi(j, d-1, x_t) & d > 1 \end{cases}$$

and $$\alpha_t(r) = \alpha_{t-1}(r)\psi(r, r, x_t)\varphi(r, 1, x_t) + \sum_{\substack{i \in S \\ i \neq r}} \sum_{d=1}^{t-1} \alpha_{t-1}(i, d)\psi(r, i, x_t)\varphi(r, d+1, x_t)$$

where i and j represent one output label respectively, r is the specific output label, d is the distance of current label from the previous specific output label and S is the collection of possible output labels and wherein the backward probabilities are computed using:

$$\beta_t(j, d) = \beta_{t+1}(r)\psi(r, j, x_{t+1})\varphi(r, d+1, x_{t+1}) + \sum_{\substack{i \in S, \\ i \neq r}} \beta_{t+1}(i, d+1)\psi(i, j, x_{t+1})\varphi(i, d+1, x_{t+1})$$

and $$\beta_t(r) = \beta_{t+1}(r)\psi(r, r, x_{t+1})\varphi(r, 1, x_{t+1}) + \sum_{\substack{i \in S, \\ i \neq r}} \beta_{t+1}(i, 1)\psi(i, r, x_{t+1})\varphi(i, 1, x_{t+1}).$$

7. The method of claim 5, wherein re-estimating the weights comprises using: $\lambda_k = (\tilde{E}(f_k) - E(f_k)) \cdot \sigma^2$ and $\theta_l = (\tilde{E}(\theta_l) - E(\theta_l)) \cdot \sigma^2$ where The $\sigma^2$ is a preset parameter to help in avoiding over fitting, vector $\tilde{E}(f_k)$ and $\tilde{E}(\theta_l)$ are actual expectations obtained by counting how often each feature occurs in training data and $E(f_k)$ and $E(\theta_l)$ are the estimated expectations.

8. The method of claim 5, wherein computing forward and backward probabilities and re-estimating the weights comprises iterating the computing the forward and the backward probabilities and re-estimating the weights until convergence.

9. The method of claim 1, wherein the constructed searching lattice comprises nodes and edges with different distances from the labels, and wherein determining the label sequence comprises using a Viterbi searching method.

10. A computer storage device having computer-executable instructions that, when executed by a processor, perform a method for an expanded Conditional Random Field (eCRF) model prediction, comprising:
performing actions, by an eCRF manager, relating to eCRF applications, the actions comprising:
accessing an eCRF model that includes modeling of labels with long-distance dependencies;
constructing a searching lattice comprising nodes and edges using input data;
extracting features using the searching lattice for the nodes and edges in the searching lattice, wherein the features include feature values, and wherein the feature values are based on a distance from the labels with long-distance dependencies;
computing probabilities of the nodes and the edges in the searching lattice;
a label sequence using the searching lattice; and
outputting the label sequence.

11. The computer storage device of claim 10, wherein the eCRF model is expressed by:
$p(Y,X) = \Pi_{t=1}^{T} \exp\{\Sigma_{k=1}^{K} \lambda_k f_k(y_t, y_{t-1}, x_t) + \Sigma_{l=1}^{L} \theta_l g_l(y_t, d_t^r, x_t)\}$ where T is the sequence, K is the number of feature functions, $\lambda_k$ is the weight for k-th feature functions $f_k$, which model a relationship among current input feature $x_t$, a previous output label $y_{t-1}$ and a current output label $y_t$, and where L is a number of dynamic feature functions, $\theta_1$ is a weight for l-th feature functions $g_l$, and $d_t^r$ are a distance of the current label from/to a previous/next specific output label r.

12. The computer storage device of claim 11, further comprising extracting the features $f_k(y_t, y_{t-1}, x_t)$ and $\theta_l(y_t, d_t^r, x_t)$ from the input data and initializing weights $\lambda_k$ and $\theta_1$.

13. The computer storage device of claim 11, further comprising computing forward and backward probabilities and re-estimating the weights.

14. The computer storage device of claim 13, wherein computing the forward probabilities is computed using:

$$\alpha_t(j, d) = \begin{cases} \alpha_{t-1}(r)\psi(j, r, x_t)\varphi(j, 1, x_t) & d=1 \\ \sum_{i \in S, i \neq r} \alpha_{t-1}(i, d-1)\psi(j, i, x_t)\varphi(j, d-1, x_t) & d>1 \end{cases}$$

and $$\alpha_t(r) = \alpha_{t-1}(r)\psi(r, r, x_t)\varphi(r, 1, x_t) + \sum_{\substack{i \in S, \\ i \neq r}} \sum_{d=1}^{t-1} \alpha_{t-1}(i, d)\psi(r, i, x_t)\varphi(r, d+1, x_t)$$

where i and j represent one output label respectively, r is the specific output label, d is the distance of current label from the previous specific output label and S is the collection of possible output labels and wherein the backward probabilities are computed using:

$$\beta_t(j, d) = \beta_{t+1}(r)\psi(r, j, x_{t+1})\varphi(r, d+1, x_{t+1}) + \sum_{\substack{i \in S, \\ i \neq r}} \beta_{t+1}(i, d+1)\psi(i, j, x_{t+1})\varphi(i, d+1, x_{t+1})$$

and $$\beta_t(r) = \beta_{t+1}(r)\psi(r, r, x_{t+1})\varphi(r, 1, x_{t+1}) + \sum_{\substack{i \in S, \\ i \neq r}} \beta_{t+1}(i, 1)\psi(i, r, x_{t+1})\varphi(i, 1, x_{t+1}).$$

15. The computer-readable medium of claim 13, wherein re-estimating the weights comprises using: $\lambda_k = (\tilde{E}(f_k) - E(f_k)) \cdot \sigma^2$ and $\theta_l = (\tilde{E}(\theta_l) - E(\theta_l)) \cdot \sigma^2$ where The $\sigma^2$ is a preset parameter to help in avoiding over fitting, vector $\tilde{E}(f_k)$ and $\tilde{E}(\theta_l)$ are actual expectations obtained by counting how often each feature occurs in training data and $E(f_k)$ and $E(\theta_l)$ are the estimated expectations.

16. The computer storage device of claim 13, wherein computing the forward and backward probabilities and re-estimating the weights comprises iterating the computing the forward and the backward probabilities and re-estimating the weights until convergence.

17. A system for an expanded CRF model, comprising:
a network connection that is coupled to tenants of the multi-tenant service;
a processor and a computer-readable medium;
an operating environment stored on the computer-readable medium and executing on the processor; and
an eCRF manager operating under the control of the operating environment and operative to perform actions comprising:
accessing an expanded Conditional Random Field (eCRF) model that includes modeling of labels with long-distance dependencies that is expressed by: $p(Y, X) = \Pi_{t=1}^{T} \exp\{\Sigma_{k=1}^{K} \lambda_k f_k(y_t, y_{t-1}, x_t) + \Sigma_{l=1}^{L} \theta_l g_l(y_t, d_t^r, x_t)\}$ where T is the length of the sequence, K is the number of feature functions, $\lambda_k$ is the weight for k-th feature functions $f_k$, which model a relationship among current input feature $x_t$, a previous output label $y_{t-1}$ and a current output label $y_t$, and where L is a number of dynamic feature functions, $\theta_1$ is a weight for l-th feature functions $g_l$, and $d_t^r$ are a distance of the current label from/to a previous/next specific output label r;

a searching lattice comprising nodes and edges using input data;
extracting features using the searching lattice;
computing probability of the nodes and the edges in the searching lattice;
determining a label sequence using the searching lattice; and
outputting the label sequence.

18. The system of claim 17, further comprising computing forward and backward probabilities and re-estimating the weights.

19. The system of claim 18, wherein computing the forward probabilities is computed using:

$$\alpha_t(j, d) = \begin{cases} \alpha_{t-1}(r)\psi(j, r, x_t)\varphi(j, 1, x_t) & d = 1 \\ \sum_{i \in S, i \neq r} \alpha_{t-1}(i, d-1)\psi(j, i, x_t)\varphi(j, d-1, x_t) & d > 1 \end{cases}$$

and $$\alpha_t(r) = \alpha_{t-1}(r)\psi(r, r, x_t)\varphi(r, 1, x_t) + \sum_{\substack{i \in S \\ i \neq r}} \sum_{d=1}^{t-1} \alpha_{t-1}(i, d)\psi(r, i, x_t)\varphi(r, d+1, x_t)$$

where i and j represent one output label respectively, r is the specific output label, d is the distance of current label from the previous specific output label and S is the collection of possible output labels.

20. The system of claim 18, wherein computing the forward and backward probabilities and re-estimating the weights comprises iterating the computing the forward and the backward probabilities and re-estimating the weights until convergence.

* * * * *